United States Patent
Antonelli (10) Patent No.: US 11,874,229 B2
(45) Date of Patent: Jan. 16, 2024

(54) APPARATUS AND METHOD FOR MULTIPLE SOURCE EXCITATION RAMAN SPECTROSCOPY

(71) Applicant: Onto Innovation Inc., Wilmington, MA (US)

(72) Inventor: George Andrew Antonelli, Portland, OR (US)

(73) Assignee: Onto Innovation Inc., Wilmington, MA (US)

( * ) Notice: Subject to any disclaimer, the term of this patent is extended or adjusted under 35 U.S.C. 154(b) by 0 days.

(21) Appl. No.: 17/715,862

(22) Filed: Apr. 7, 2022

(65) Prior Publication Data

US 2023/0324303 A1    Oct. 12, 2023

(51) Int. Cl.
*G01N 21/65* (2006.01)
*G01J 3/44* (2006.01)
(Continued)

(52) U.S. Cl.
CPC ............ *G01N 21/65* (2013.01); *G01J 3/0208* (2013.01); *G01J 3/0224* (2013.01); *G01J 3/10* (2013.01);
(Continued)

(58) Field of Classification Search
None
See application file for complete search history.

(56) References Cited

U.S. PATENT DOCUMENTS

| | | |
|---|---|---|
| 3,817,633 A | 6/1974 | White |
| 4,795,256 A | 1/1989 | Krause et al. |

(Continued)

FOREIGN PATENT DOCUMENTS

| | | |
|---|---|---|
| CN | 101839860 A | 9/2010 |
| CN | 105973829 A | 9/2016 |

(Continued)

OTHER PUBLICATIONS

Geng, Yijia, et al. "Note: A portable Raman analyzer for microfluidic chips based on a dichroic beam splitter for integration of imaging and signal collection light paths." Review of Scientific Instruments 86.5 (2015): 056109 (Year: 2015).*

(Continued)

*Primary Examiner* — Kevin Quarterman
*Assistant Examiner* — Roberto Fabian, Jr.
(74) *Attorney, Agent, or Firm* — Paradice & Li LLP (57) ABSTRACT

An optical metrology device performs multi-wavelength polarized confocal Raman spectroscopy. The optical metrology device uses a first light source to produce a first light beam with a first wavelength and a second light source to produce a second light beam with a second wavelength. A dichroic beam splitter partially reflects the first light beam and transmits the second light beam to combine the light beams along a same optical axis that is incident on a sample. The dichroic beam splitter directs the Raman response emitted from the sample in response to the first light beam and the second light beam together towards at least one spectrometer and directs the first light beam away from the at least one spectrometer. A chopper may be used to isolate the Raman response to the first and second light beams that is received and spectrally measured by the at least one spectrometer.

20 Claims, 6 Drawing Sheets

(51) Int. Cl.
  *G01J 3/02* (2006.01)
  *G01J 3/18* (2006.01)
  *G02B 27/14* (2006.01)
  *G01J 3/10* (2006.01)
(52) U.S. Cl.
  CPC .............. *G01J 3/18* (2013.01); *G01J 3/4412* (2013.01); *G02B 27/141* (2013.01)

(56) References Cited

U.S. PATENT DOCUMENTS

| | | | |
|---|---|---|---|
| 6,961,080 B2* | 11/2005 | Richardson | G01N 21/6458 348/80 |
| 7,298,492 B2 | 11/2007 | Tixier | |
| 7,336,356 B2 | 2/2008 | Vannuffelen et al. | |
| 7,710,577 B2 | 5/2010 | Yatagai et al. | |
| 7,804,593 B2 | 9/2010 | Becker-Rob et al. | |
| 8,674,306 B2* | 3/2014 | Falk | G01N 21/65 250/343 |
| 9,128,037 B2 | 9/2015 | Disch et al. | |
| 9,869,585 B2 | 1/2018 | Schiering et al. | |
| 10,104,363 B2 | 10/2018 | Fisker et al. | |
| 10,876,891 B1 | 12/2020 | Mitchell | |
| 10,901,241 B1* | 1/2021 | Antonelli | G01B 9/02002 |
| 10,918,287 B2 | 2/2021 | Islam | |
| 10,942,116 B2 | 3/2021 | Prater et al. | |
| 11,073,423 B2 | 7/2021 | Tufillaro et al. | |
| 2008/0212095 A1 | 9/2008 | Van Nijnatten et al. | |
| 2014/0361171 A1* | 12/2014 | Disch | G01J 3/427 250/338.5 |
| 2016/0116414 A1* | 4/2016 | Day | G01N 21/49 356/301 |
| 2021/0237080 A1* | 8/2021 | Lionberger | B01L 3/502761 |
| 2021/0389247 A1* | 12/2021 | Tsai | G02B 27/1013 |

FOREIGN PATENT DOCUMENTS

| | | |
|---|---|---|
| CN | 107179308 A | 9/2017 |
| CN | 111256821 A | 6/2020 |
| EP | 2247929 B1 | 9/2016 |
| WO | WO2019/156497 | 8/2019 |

OTHER PUBLICATIONS

Pajcini, Vasil, et al. "UV Raman microspectroscopy: spectral and spatial selectivity with sensitivity and simplicity." Applied Spectroscopy 51.1 (1997): 81-86 (Year: 1997).*

Moore, David S., and Jeffery A. Leiding. "Vibrational spectroscopy of shock compressed condensed phase nitrous oxide: Frequency shifts in the v1 mode." Journal of Applied Physics 128.15 (2020) (Year: 2020).*

Bertani, Francesca R., "Living Matter Observations with a Novel Hyperspectral Supercontinuum Confocal Microscope for VIS to Near-IR Reflectance Spectroscopy," Sensors Open Access ISSN 1424-8220, www.mdpi.com/journal/sensors, Oct. 25, 2013.

Zhao, Ying et al., "Development and Application of Fluorescence Suppression Based on Multi Wavelength Raman Spectrometer," China Academic Journal Electronic Publishing House, Spectroscopy and Spectral Analysis, vol. 42, No. 1, pp. 86-92, Jan. 2022.

* cited by examiner

APPARATUS AND METHOD FOR MULTIPLE SOURCE EXCITATION RAMAN SPECTROSCOPY

FIELD OF THE DISCLOSURE

Embodiments of the subject matter described herein are related generally to non-destructive measurement of a sample, and more particularly to characterization of a sample using optical metrology.

BACKGROUND

Semiconductor and other similar industries often use optical metrology equipment to provide non-contact evaluation of substrates during processing. With optical metrology, a sample under test is illuminated with light, e.g., at a single wavelength or multiple wavelengths. After interacting with the sample, the resulting light is detected and analyzed to determine a desired characteristic of the sample.

One type of optical metrology that may be used to characterize the composition and phase of a materials as well as the stress in semiconductor device structures is Raman spectroscopy. Raman instruments rely on the use of a light source, such a laser, that is focused onto a sample to generate a Raman scattering response which is collected and in turn measured by means of a spectrometer. Raman spectroscopy involves the interaction of the excitation light with the vibrational states of bonds in matter to produce the Raman scattering response. Autofluorescence is material specific and, accordingly, to produce accurate measurements for different materials, different excitation frequencies are sometimes used. Conventional Raman instruments that use multiple excitation frequencies typically require reconfiguration between measurements with different excitation frequencies, e.g., to switch filters used to filter the different excitations sources from the spectra input to the spectrometer, resulting in low throughput. Optical metrology devices using Raman spectroscopy techniques may be improved.

SUMMARY

An optical metrology device performs multi-wavelength polarized confocal Raman spectroscopy. The optical metrology device uses a first light source to produce a first light beam with a first wavelength and a second light source to produce a second light beam with a second wavelength. A dichroic beam splitter partially reflects the first light beam and transmits the second light beam to combine the light beams along a same optical axis that is incident on a sample. The dichroic beam splitter directs the Raman response emitted from the sample in response to the first light beam and the second light beam together towards at least one spectrometer and directs the first light beam away from the at least one spectrometer. A chopper may be used to isolate the Raman response to the first and second light beams that is received and spectrally measured by the at least one spectrometer.

In one implementation, an optical metrology device for Raman spectroscopy may include a first light source that generates a first light beam with a first wavelength and a second light source that generates a second light beam with a second wavelength. A first dichroic beam splitter partially reflects the first wavelength and transmits the second wavelength resulting in the first light beam and the second light beam propagating along a same optical axis that is incident on a sample. The first dichroic beam splitter receives a first Raman response that is emitted from the sample in response to the first light beam, a second Raman response that is emitted from the sample in response to the second light beam, the first light beam reflected from the sample, and the second light beam reflected from the sample. The first dichroic beam splitter directs the second light beam reflected from the sample, the first dichroic beam splitter directs the first Raman response and the second Raman response together without the first light beam reflected from the sample towards at least one spectrometer. At least one spectrometer receives from the first dichroic beam splitter the first Raman response and the second Raman response that are emitted from the sample.

In one implementation, a method of Raman spectroscopy includes generating a first light beam having a first wavelength with a first light source and generating a second light beam having a second wavelength with a second light source. The method may further include partially reflecting the first wavelength and transmitting the second wavelength with a first dichroic beam splitter to propagate the first light beam and the second light beam along a same optical axis that is incident on a sample. The method may further include receiving with the first dichroic beam splitter a first Raman response emitted from the sample in response to the first light beam, a second Raman response that is emitted from the sample in response to the second light beam, the first light beam reflected from the sample, and the second light beam reflected from the sample. The method may further include directing with the first dichroic beam splitter the first Raman response and the second Raman response together without the first light beam reflected from the sample together towards at least one spectrometer. The method may further include receiving the first Raman response and the second Raman response that are emitted from the sample from the first dichroic beam splitter with at least one spectrometer.

In one implementation, an optical metrology device for Raman spectroscopy may include a means for generating a first light beam having a first wavelength and a means for generating a second light beam having a second wavelength. The optical metrology device may further include a means for partially reflecting the first wavelength and transmitting the second wavelength with to propagate the first light beam and the second light beam along a same optical axis that is incident on a sample, and receiving a first Raman response emitted from the sample in response to the first light beam, a second Raman response that is emitted from the sample in response to the second light beam, the first light beam reflected from the sample, and the second light beam reflected from the sample, and directing the first Raman response and the second Raman response together without the first light beam reflected from the sample to be spectrally measured. The optical metrology device may further include a means for spectrally measuring the first Raman response and the second Raman response that are emitted from the sample from the first dichroic beam splitter.

DETAILED DESCRIPTION

During fabrication of semiconductor and similar devices it is sometimes necessary to monitor the fabrication process by non-destructively measuring the devices. Optical metrology is sometimes employed for non-contact evaluation of samples during processing.

One type of optical metrology that may be used to characterize the composition and phase of a materials as well as the stress in semiconductor device structures is Raman spectroscopy. Raman spectroscopy is complementary to Fourier Transform infrared (FTIR) spectroscopy. Both FTIR and Raman involve the interaction of light with the vibrational states of bonds in matter. FTIR is a linear process and detects the absorption of light by vibrating bonds where a particular bond is active if there is a change in dipole moment (IR active). Raman, on the other hand, is a nonlinear process and the result of the scattering of light by the vibrating bonds where a particular bond is active if there is a change in polarizability (Raman active). Many bonds are both IR and Raman active, but some bonds are only active for one or the other hence the complementary nature of the Raman and FTIR techniques.

There are, however, significant differences between Raman spectroscopy and FTIR spectroscopy due to their differing linear and non-linear natures. The nonlinearity in Raman implies that a focused laser beam will have the strongest Raman signal near the focal point which allows the analysis of a highly localized volume of a sample where conventional FTIR is sensitive to the entirety of the illuminated region. Changing the wavelength of the Raman excitation and its use in a confocal optical geometry allows further specificity of the measurement volume.

Conventional Raman instruments rely on the use of one or more laser sources focused onto a sample to generate a Raman scattering response which is collected and in turn measured by means of a spectrometer. A set of filters tailored to the specific laser source is used to remove the excitation source from the spectra input to the spectrometer. Where multiple excitation sources are available, when there is a change in the excitation source, a corresponding change in filters is typically used, e.g., by means of a filter wheel mechanism, to remove the specific frequency of the current excitation source. Thus, when changing excitation sources, Raman instruments typically require a mechanical alteration in the optical configuration, e.g., by physically moving one or more components, to properly filter the excitation frequencies from the spectra input to the spectrometer, thereby decreasing throughput.

As described herein, an optical metrology device may perform multi-wavelength polarized confocal Raman spectroscopy without requiring reconfiguration of the optical system to filter excitation wavelengths from the Raman response. The optical metrology device, accordingly, enables multi-wavelength Raman spectroscopy with increased throughput and simplified implementation and operation compared to conventional Raman devices. The optical metrology device may employ multi wavelength polarized confocal Raman spectroscopy, e.g., using a multiple light sources with different excitation wavelengths, which produce a Raman response from the sample having different (non-overlapping) ranges of wavelengths. The optical metrology device employs one or more dichroic beam splitters to combine the excitation light beams and to filter the excitation light beams from the Raman response. Additionally, the one or more dichroic beam splitters may be used to separate the Raman responses, which may be provided to separate spectrometers. For example, a dichroic beam splitter may be configured to direct a first excitation light beam and a second excitation light beam towards the sample, and to direct the Raman responses to the first and second excitation light beams towards one or more spectrometers, while separating at least the first excitation light beam. A second dichroic beam splitter may be used to separate the second excitation light beam. A third dichroic beam splitter may be used to separate the Raman responses.

Additionally, the Raman responses may be further isolated using, e.g., a chopper that is configured to transmit one excitation light beam while blocking the other excitation light beam. The spectrometers used to spectrally measure the Raman responses may be triggered based on the orientation of the chopper to further isolate the Raman responses.

Figure 1:
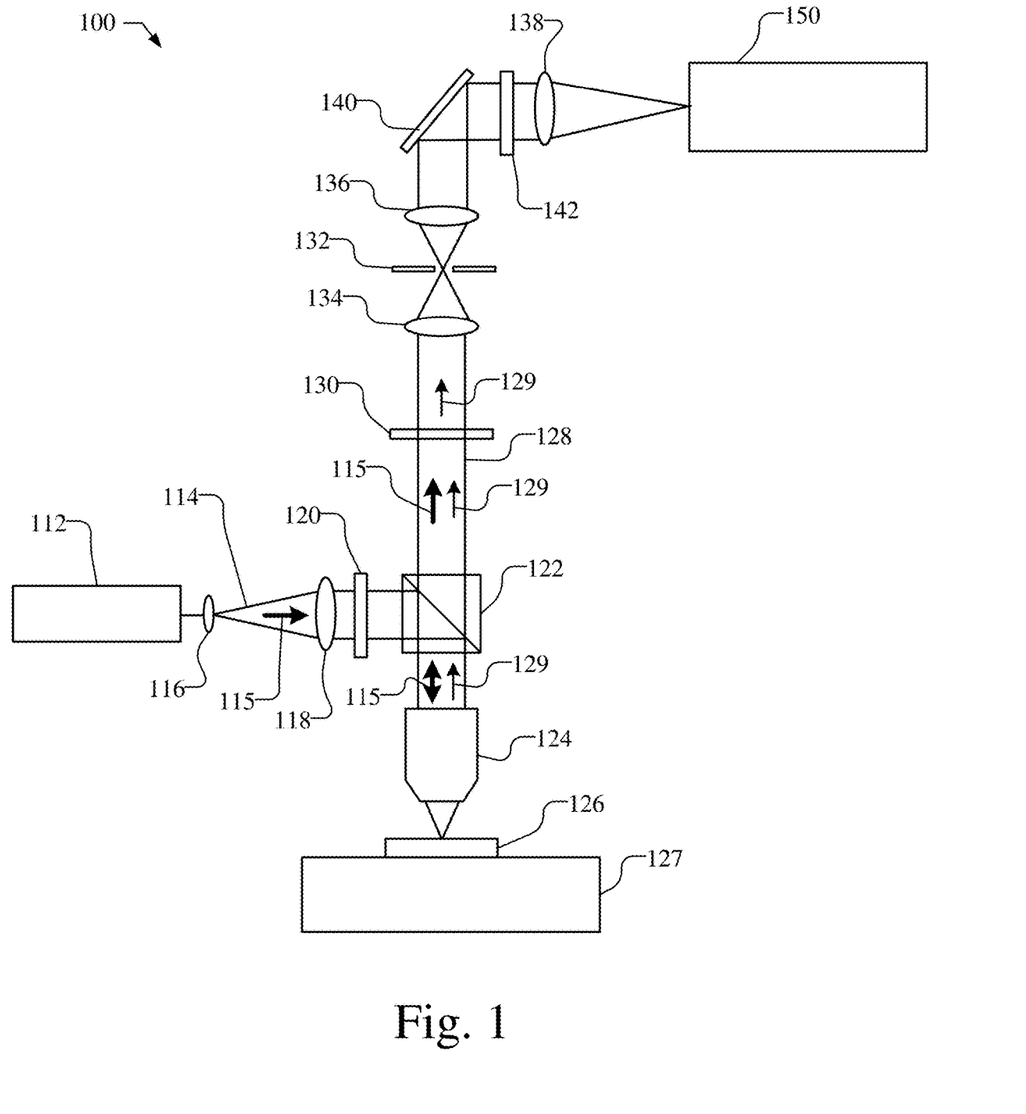
FIG. 1 illustrates a schematic representation of an optical metrology device employing Raman spectroscopy.

FIG. 1 illustrates a schematic representation of an optical metrology device 100 employing Raman spectroscopy.

Optical metrology device 100 includes a light source 112, such as a laser that produces a light beam 114, which is expanded and collimated respectively by lenses 116 and 118. The light beam 114 includes excitation frequencies, which are illustrated with relatively thick arrows 115. The light beam 114 is polarized with polarizer 120 and received by a beam splitter 122. The beam splitter 122 directs light towards an objective lens 124, which focuses the light onto a sample 126 held on a stage 127.

The light incident on the sample 126 is reflected and backscattered by the sample 126 as a response beam 128, that is received by the objective lens 124 and beam splitter 122. The interaction of the excitation frequencies in the light beam 114 with the vibrational states of bonds in the sample 126 produces the Raman scattering response, to produce the backscattered light. The backscattered light in response beam 128 has different frequencies than the excitation frequencies, and is illustrated as relatively thin arrows 129. The beam splitter 122 directs the response beam 128, including the reflected and backscattered light to a spectrometer 150.

The excitation frequencies are often orders of magnitude greater than Raman scattering response. Accordingly, an edge pass (or notch) filter 130, e.g., a Rayleigh rejection filter, is used to receive the response beam 128 and remove the excitation frequencies of the light beam 114, so that the response beam 128 directed to the spectrometer 150 includes only the backscattered light 129 without the excitation frequencies of the reflected light beam 114. The optical metrology device 100 is illustrated as including a confocal pinhole 132, along with lenses 134, 136, and 138, and folding mirror 140 between the beam splitter 122 and the spectrometer 150. Additionally, the response beam 128 passes through an analyzer 142 before the spectrometer 150.

Raman spectroscopy measurements, by way of example, may be described from the semiclassical perspective with the electric dipole moment P induced by the incident electric field E as:

$$P = \varepsilon_0 \chi = \varepsilon_0 \chi E_0 \exp[i(k_i \cdot r - \omega_i t)] \qquad \text{eq. 1}$$

where $\chi$ may be defined as:

$$\chi = \chi_0 + \left(\frac{\partial \chi}{\partial Q_j}\right)_0 Q_j + \left(\frac{\partial \chi}{\partial Q_j \partial Q_k}\right)_0 Q_j Q_k + \ldots \qquad \text{eq. 2}$$

where $$Q_j = A_j \exp[\pm i(q_j \cdot r - \omega_j t)] \rightarrow \text{phonon} \qquad \text{eq. 3}$$

The electric dipole moment P may be written as:

$$P = \varepsilon_0 \chi_0 E_0 \exp[i(k_i \cdot r - \omega_i t)] + \qquad \text{eq. 4}$$
$$\varepsilon_0 E_0 \left(\frac{\partial \chi}{\partial Q_j}\right)_0 A_j \times \exp[-i(\omega_i \pm \omega_j)t] \exp[i(k_i - q_j) \cdot r].$$

In the above equations, $\omega_i$ represents Rayleigh scattering (inelastic), $\omega_i + \omega_j$ represents anti-Stokes scattering (inelastic), and $\omega_i - \omega_j$ represents Stokes scattering (inelastic). The scattering efficiency I, may be represented as:

$$I = C \sum_j |e_i \cdot R_j \cdot e_s|^2 \qquad \text{eq. 5}$$

where $e_i$ is the incident polarization vector, $e_s$ is the scattered polarization vector, and R is the Raman tensor (group symmetry).

The optical metrology device 100 illustrated in FIG. 1 may use, e.g., a laser or other narrow band light source as the light source 112 to produce light beam 114 with narrow band excitation wavelengths. In some implementations, multiple laser sources may be used to produce multiple excitation beams. In such implementations, a specifically tailored filter 130 must be introduced into the beam path of the response beam to filter the excitation frequency. Accordingly, a change in the excitation source is accommodated by changing the Rayleigh rejection filter, e.g., by means of a filter wheel mechanism, to properly filter the excitation frequencies from the spectra that is input to the spectrometer 150.

Figure 2:
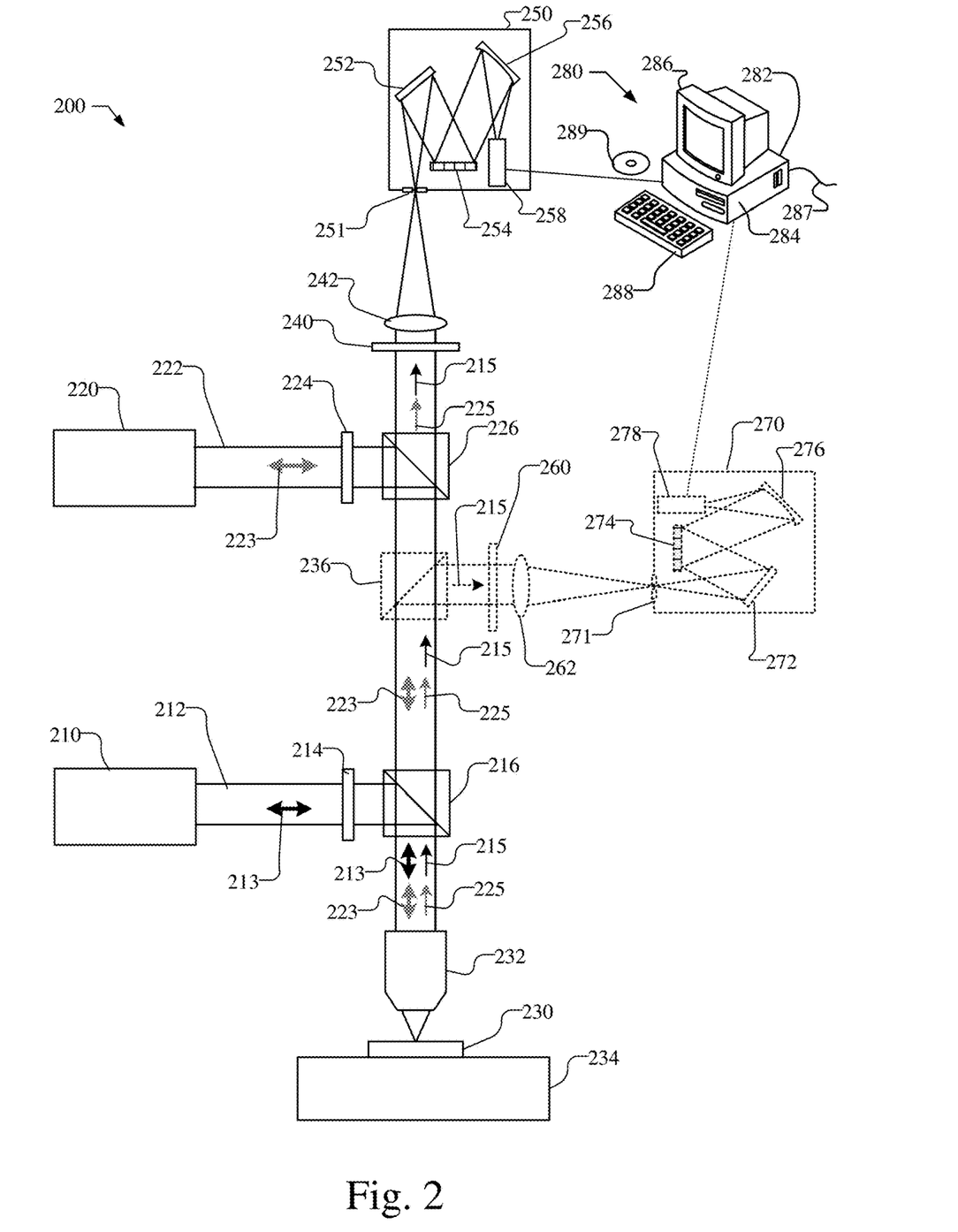
FIG. 2 illustrates a schematic representation of an optical metrology device that employs multi wavelength polarized confocal Raman spectroscopy.

FIG. 2 illustrates a schematic representation of an optical metrology device 200 that employs multi wavelength polarized confocal Raman spectroscopy. The optical metrology device 200, for example, employs multiple excitation sources without requiring moving elements to filter the excitation frequencies from the Raman scattering response. In the example provided in FIG. 2, two excitation sources are provided for dual wavelength polarized confocal Raman spectroscopy, but it should be understood that more than two excitation sources may be used through extension of the present disclosure if desired.

Optical metrology device 200 includes a first light source 210 and a second light source 220, which produce light beams 212 and 222, respectively, having different wavelengths. The first light source 210 and second light source 220, for example, may be two disparate excitation sources, e.g., first light source 210 producing ultraviolet UV light and the second light source 220 producing infrared (IR) or near IR light. For example, the first light source 210 may be a laser, light emitting diode (LED) or other narrow band light source that produces light with a wavelength of 325 nm and the second light source 220 may be a laser, LED, or other narrow band light source that produces light with a wavelength of 785 nm. As illustrated in FIG. 2, the light beam 212 produced by first light source 210 has a first wavelength 213 (illustrated by a relatively thick black arrow), while the second light beam 222 produced by second light source 220 has a second wavelength 223 (illustrated by a relatively thick grey arrow), which is different than the first wavelength 213. The light beam 212 may be polarized by polarizer 214 and light beam 222 may be polarized by polarizer 224. The light beams 212 and 222 may be linearly polarized. If desired, additional optical components may be included to rotate the polarization orientation, such as a rotating half-wave plate.

As illustrated, a first dichroic beam splitter 216 directs the light beam 212 with the first wavelength 213 towards the sample 230. For example, as illustrated in FIG. 2, the first dichroic beam splitter 216 may reflect the first wavelength 213 towards the sample 230. A second dichroic beam splitter 226 directs the light beam 222 with the second wavelength 223 towards the sample 230 and the first dichroic beam splitter 216. For example, as illustrated in FIG. 2, the second dichroic beam splitter 226 may reflect light with the second wavelength 223 towards the sample 230 and the first dichroic beam splitter 216. The first dichroic beam splitter 216 receives the light beam 222 and directs the light beam 222 towards the sample 230. For example, the first dichroic beam splitter 216 may transmit light with the second wavelength 223 towards the sample. The light beams 212 and 222 are thus combined by the first dichroic beam splitter 216 along the same optical axis and directed to the sample 230.

An objective lens 232 focuses the combined light beams 212 and 222 onto the sample 230. A stage 234 that holds the sample 230 may be configured to move the sample 230 to desired measurement positions (and focal positions). For example, the stage 234 may include actuators that are controlled by a controller 280 to move the sample 230 based on controls signals from the controller 280 to position the sample 230 at desired measurement positions. The stage 234, for example, may be capable of horizontal motion in either Cartesian (i.e., X and Y) coordinates, or Polar (i.e., R and θ) coordinates or some combination of the two. The stage 234 may also be capable of vertical motion along the Z coordinate. If the stage system is an R and θ configuration, the polarization produced by polarizers 214 and 224 may need to be linked to the rotation of the sample 230 depending on the sample type. In some implementations, one or more components of the optical system may move with respect to the stage 234 and sample 230 to position the optical system with respect to the sample 230 at desired measurement positions.

The light incident on the sample 230 is reflected from the sample, and thus light with wavelengths 213 and 223 is reflected from the sample 230, as illustrated by the black and grey double arrows, respectively. Additionally, the light beams 212 and 222 produce a Raman response to be emitted from the sample, e.g., as backscattered light having slightly different wavelengths than the excitation wavelengths. Thus, the sample 230 emits backscattered light 215 in response to the light beam 212 with the first wavelength 213, as illustrated by relatively thin black arrows 215, which has different wavelengths than the excitation frequencies of the light beam 212. Similarly, sample 230 emits backscattered light 225 in response to the light beam 222 with the second wavelength 223, as illustrated by relatively thin grey arrows 225, which has different wavelengths than the excitation frequencies of the light beam 222. The objective lens 232 receives the reflected light with wavelengths 213 and 223 and the backscattered light 215 and 225, which is directed to the first dichroic beam splitter 216.

The first dichroic beam splitter 216 receives the reflected light having wavelengths 213 and 223 and the backscattered light 215 and 225 and is configured to prevent the first wavelength 213 from passing (e.g., by reflecting the first wavelength 213 as illustrated in FIG. 2), but passes (e.g., transmits as illustrated in FIG. 2) light with the second wavelength 223, as well as the backscattered light 215 and 225.

The second dichroic beam splitter 226 may receive the light with the second wavelength 223 and the backscattered light 215 and 225, and may be configured to prevent the second wavelength 223 from passing (e.g., by reflecting the second wavelength 223 as illustrated in FIG. 2), but may pass (e.g., transmit as illustrated in FIG. 2) the backscattered light 225 and optionally the backscattered light 215.

The backscattered light 215 and 225 may pass through an analyzer 240 and may be received by a first spectrometer 250 which spectrally measures the Raman response. As illustrated, a lens 242 may focus the backscattered light 215 and 225 on an entrance slit 251 of the spectrometer 250. The spectrometer 250 is illustrated as including focusing mirrors 252 and 256, a diffraction grating 254, and a detector 258, such as a CCD camera.

In some implementations, as illustrated with dotted lines, a second spectrometer 270 may be used to receive the backscattered light 215, while the first spectrometer 250 receives the backscattered light 225. For example, a third dichroic beam splitter 236 may be located between dichroic beam splitters 216 and 226. The third dichroic beam splitter 236 may receive the light with the second wavelength 223 and the backscattered light 215 and 225, and may be configured to separate the backscattered light 215 from the backscattered light 225 and the light with the second wavelength 223. For example, as illustrated in FIG. 2, the optional third dichroic beam splitter 236 may be configured to reflect backscattered light 215 towards the second spectrometer 270 and to transmit the backscattered light 225 towards the second dichroic beam splitter 226, while transmitting light with the second wavelength 223, e.g., from the second dichroic beam splitter 226 towards the sample 230 and from the sample 230 to the second dichroic beam splitter 226. In the present implementation, in which the third dichroic beam splitter 236 is used, the second dichroic beam splitter 226 transmits only the backscattered light 225 towards the first spectrometer 250. With use of the third dichroic beam splitter 236, the backscattered light 215 may pass through a second analyzer 260 before being received by the second spectrometer 270. A lens 262 may focus the backscattered light 215 on an entrance slit 271 of the second spectrometer 270. Similar to spectrometer 250, the second spectrometer 270 may include focusing mirrors 272 and 276, a diffraction grating 274, and a detector 278, such as a CCD camera.

With the use of the second spectrometer 270, each diffraction gratings 254 and 274 in the first spectrometer 250 and second spectrometer 270, respectively, may be specifically configured for the specific wavelength ranges of the received backscattered light 225 and 215, e.g., with a spectral dispersion to maximize the spread of the spectrum across the detectors 258 and 278, respectively.

It should be understood that one or more additional components may be included in the optical metrology device 200. For example, one or more confocal pinholes, along with accompanying lenses, as well as folding mirrors, etc. may be used, as illustrated in FIG. 1.

In some implementations, one or more of the first dichroic beam splitter 216, second dichroic beam splitter 226, optional third dichroic beam splitter 236, or any combination thereof, may each be replaced with combination of a beam splitter (e.g., half-mirrored beam splitter) and a filter, e.g., a Rayleigh rejection filter, an edge pass filter, or notch filter, that is positioned after the beam splitter (i.e., closer to the spectrometer 250) and is tailored to pass desired wavelengths and to filter other wavelengths. For example, the first dichroic beam splitter 216 may be substituted with a beam splitter and a filter that passes the backscattered light 215 and 225 and the second wavelength 223, but filters the first wavelength 213 (e.g., the filter may be an edge filter). In some implementations, the dichroic filter that replaces the first dichroic beam splitter 216 may also filter the second wavelength 223, e.g., the filter may be a notch filter or multiple notch filters. The third dichroic beam splitter 236, if present, may be substituted with a beam splitter and optionally with a filter between the beam splitter and the second spectrometer 270 that filters the backscattered light 225 and passes the backscattered light 215. The second dichroic beam splitter 226 may be substituted with a beam splitter and a filter that filters the second wavelength 223 (and the first wavelength 213 if not previously filtered) but passes the backscattered light 225 (if the second spectrometer 270 is used) or that passes both the backscattered light 215 and 225 (if the second spectrometer 270 is not used). In general, the Raman efficiency, however, is weak, e.g., approximately $1/\lambda^4$, and accordingly, the use of one or more half-mirrored beam splitters and Rayleigh rejection filters in place of one or more dichroic beam splitter(s) 216, 226, or 236, will attenuate the response signal and may increase the signal to noise ratio and render accurate measurement of the Raman scattering response difficult.

The spectrometer 250 and spectrometer 270 (if used), as well as other components of the optical metrology device 200, such as the light sources 210 and 220, polarizers 214 and 224, analyzers 240 and 260 (if used), and the stage 234, may be coupled to at least one controller 280, such as a workstation, a personal computer, central processing unit or other adequate computer system, or multiple systems. It should be understood that the controller 280 includes one or more processing units 282 that may be separate or linked processors, and controller 280 may be referred to herein sometimes as a processor 280, at least one processor 280, one or more processors 280, etc. The controller 280 is preferably included in, or is connected to, or otherwise associated with optical metrology device 200. The controller 280, for example, may control the positioning of the sample 230, e.g., by controlling movement of the stage 234 on which the sample 230 is held. The controller 280 may further control the operation of a chuck on the stage 234 used to hold or release the sample 230. The controller 280 may also collect and analyze the data obtained from the spectrometers 250 and 270 (if used). The controller 280 may analyze the data to determine one or more physical characteristics of the sample, e.g., based on Raman scattering as discussed above, for the multiple excitation wavelengths employed. In some implementations, the measured data may be obtained and compared to a modeled data, which may be stored in a library or obtained in real time. Parameters of the model may be varied, and modeled data compared to the measured data, e.g., in a linear regression process, until a good fit is achieved between the modeled data and the measured data, at which time the modeled parameters are determined to be the characteristics of the sample 230.

The controller 280 includes at least one processing unit 282 and memory 284, as well as a user interface including e.g., a display 286 and input devices 288. A non-transitory computer-usable storage medium 289 having computer-readable program code embodied may be used by the at least one processor 282 for causing the at least one processor 282 to control the optical metrology device 200 and to perform the measurement functions and analysis described herein. The data structures and software code for automatically implementing one or more acts described in this detailed description can be implemented by one of ordinary skill in the art in light of the present disclosure and stored, e.g., on a computer-usable storage medium 289, which may be any device or medium that can store code and/or data for use by a computer system such as processing unit 282. The computer-usable storage medium 289 may be, but is not limited to, flash drive, magnetic and optical storage devices such as disk drives, magnetic tape, compact discs, and DVDs (digital versatile discs or digital video discs). A communication port 287 may also be used to receive instructions that may be stored on memory 284 and used to program the processor 282 to perform any one or more of the functions described herein and may represent any type of communication connection, such as to the internet or any other computer network. The communication port 287 may further export signals, e.g., with measurement results and/or instructions, to another system, such as external process tools, in a feed forward or feedback process in order to adjust a process parameter associated with a fabrication process step of the samples based on the measurement results. Additionally, the functions described herein may be embodied in whole or in part within the circuitry of an application specific integrated circuit (ASIC) or a programmable logic device (PLD), and the functions may be embodied in a computer understandable descriptor language which may be used to create an ASIC or PLD that operates as herein described. The results from the analysis of the data may be stored, e.g., in memory 284 associated with the sample and/or provided to a user, e.g., via display 286, an alarm, data set, or other output device. Moreover, the results from the analysis may be fed back to the process equipment to adjust the appropriate patterning step to compensate for any detected variances in the processing.

As noted above, the Raman efficiency is relatively weak, approximately $1/\lambda^4$. Moreover, the autofluorescence of commonly measured materials may be relatively high in certain wavelengths.

Figure 3:
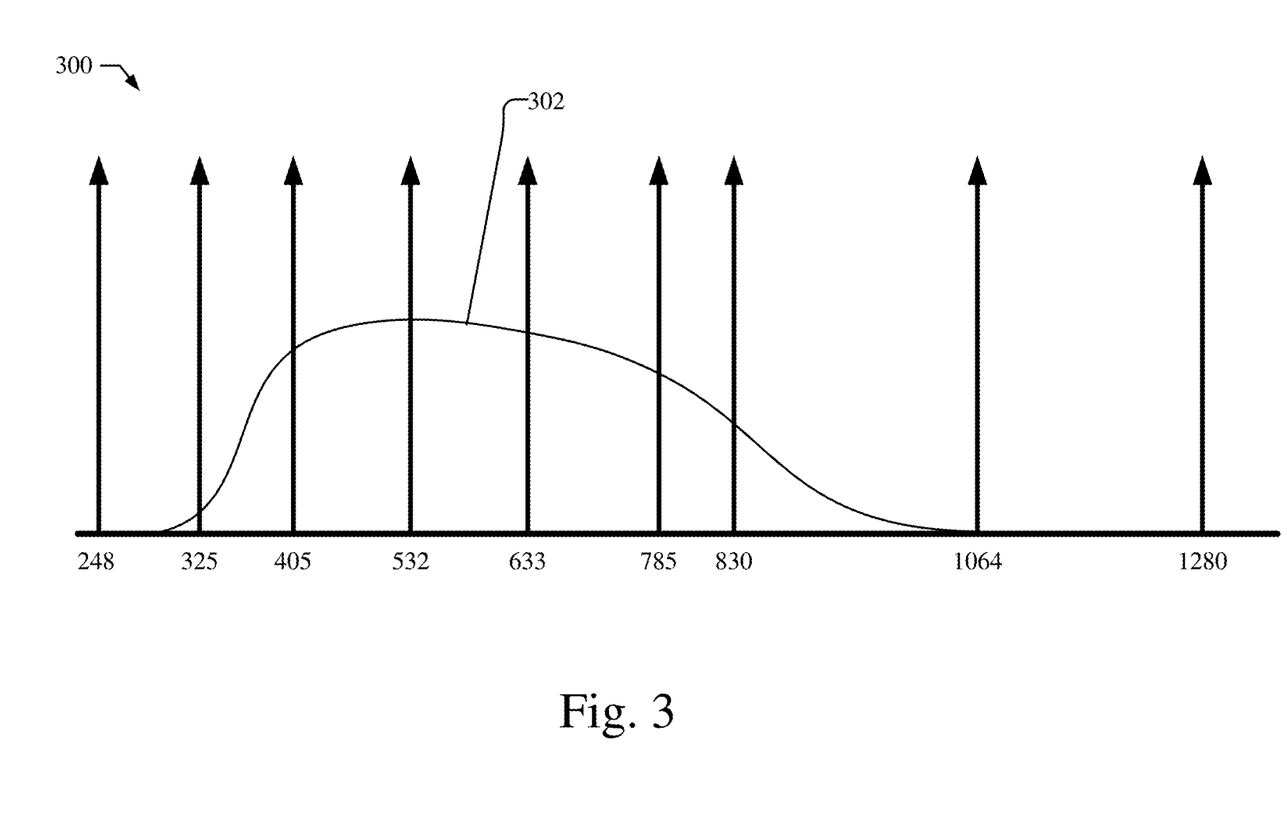
FIG. 3 is a graph illustrating the various wavelengths that may be used by light sources of the optical metrology device and wavelengths of autofluorescence that may be produced in response to the excitation wavelengths.

FIG. 3, by way of example, is a graph 300 illustrating the various wavelengths that may be used by light sources, illustrated with arrows, and a representative illustration of autofluorescence 302 that may be produced by various materials in response to the excitation wavelengths. Autofluorescence and Raman scattering are similar processes, as both involve the interaction of light with the vibrational states of bonds in matter. Autofluorescence, such as used in FTIR, is a linear process and detects the absorption of light by vibrating bonds where a particular bond is active if there is a change in dipole moment (IR active). Raman, on the other hand, is a nonlinear process and the result of the scattering of light by the vibrating bonds and is active if there is a change in polarizability (Raman active). Many bonds are both IR and Raman active, but some bonds are only one or the other hence the complementary nature of these two techniques.

In general, autofluorescence is material specific, with some materials fluorescing more than others. Copper, for example, has a very strong fluorescence response which may overshadow the weaker Raman signature. In another example, silicon has a strong Raman response, which may make it difficult to measure the weaker Raman signatures from dielectrics. Sometimes, the dielectric material may be deposited on an opaque metal to isolate the dielectric response, which requires the use of the correct metal and excitation wavelength to avoid measuring the fluorescence of the metal. Due to the similarity of the autofluorescence and Raman processes, with the relatively weak Raman efficiency and relatively strong autofluorescence response, the wavelengths of the multiple light sources in the optical metrology device 200 should be judiciously selected. For example, the two wavelength regimes for the light sources may be selected due to (1) weakness of the fluorescence in both of the wavelength regions, (2) high Raman efficiency (e.g., towards ultraviolet (UV)), (3) larger spectral range (e.g., near infrared (IR) allowing higher resolution measurement, (4) disparate absorption lengths in a given material, and (5) the Raman signals will be spectrally separated. Table 1 below, by way of example, illustrates a comparison table for various excitation sources (wavelengths).

TABLE 1

| Laser λ (nm) | Laser Raman Eff.* | k ($cm^{-1}$) | Raman Shift Range | | Raman Shift Range | | Range |
|---|---|---|---|---|---|---|---|
| | | | Min. ($cm^{-1}$) | Max. ($cm^{-1}$) | Min. (nm) | Max. (nm) | |
| 325 | 7.18 | 30769 | 400 | 4000 | 329 | 374 | 44 |
| 355 | 5.04 | 28169 | 400 | 4000 | 360 | 414 | 54 |
| 404 | 3.01 | 24752 | 400 | 4000 | 411 | 482 | 71 |
| 488 | 1.41 | 20492 | 400 | 4000 | 498 | 606 | 109 |
| 532 | 1.00 | 18797 | 400 | 4000 | 544 | 676 | 132 |
| 785 | 0.21 | 12739 | 400 | 4000 | 810 | 1144 | 334 |
| 1065 | 0.06 | 9390 | 400 | 4000 | 1112 | 1855 | 743 |

*Scaled relative to excitation at 532 nm

Based on the above criteria and the comparison table, various disparate excitation sources may be selected. In one example, a pair of excitation sources have wavelengths 325 nm and 785 nm, although other excitation source pairs may be selected. As illustrated in Table 1, with an excitation source of 325 nm, the Raman spectra from 400 $cm^{-1}$ to 4000 $cm^{-1}$ would fall in a range from 329 nm to 374 nm, while with an excitation source of 785 nm, the Raman spectra from 400 $cm^{-1}$ to 4000 $cm^{-1}$ would fall in a range from 810 nm to 1144 nm, and thus, with these excitation sources, the Raman signals will be spectrally separated. With such a selection or other selections of excitation source pairs, it is possible to design the optical system capable of simultaneously operating at these two excitations without compromising capability.

In some implementations, the optical metrology device that employs dual wavelength polarized confocal Raman spectroscopy may include one or more addition components to assist in isolating the Raman response signals. For example, multiple spectrometers may be used with the gratings within the spectrometers with the dispersion tailored for the wavelength ranges of the Raman response received. Additionally, line filters, such as long pass filters, may be employed to isolate the Raman signals. A mechanical or electro-optical chopper may be further used to isolate the two signals. For example, prior to being focused on the sample, the two collimated excitation sources may be brought into the same plane propagating parallel to each other and may impinge on opposite sides of a rotating chopper whose blade is antisymmetric, i.e., the blade is open on one side and closed on the other. The spectrometers may be triggered based on the position of the rotating chopper.

Figure 4:
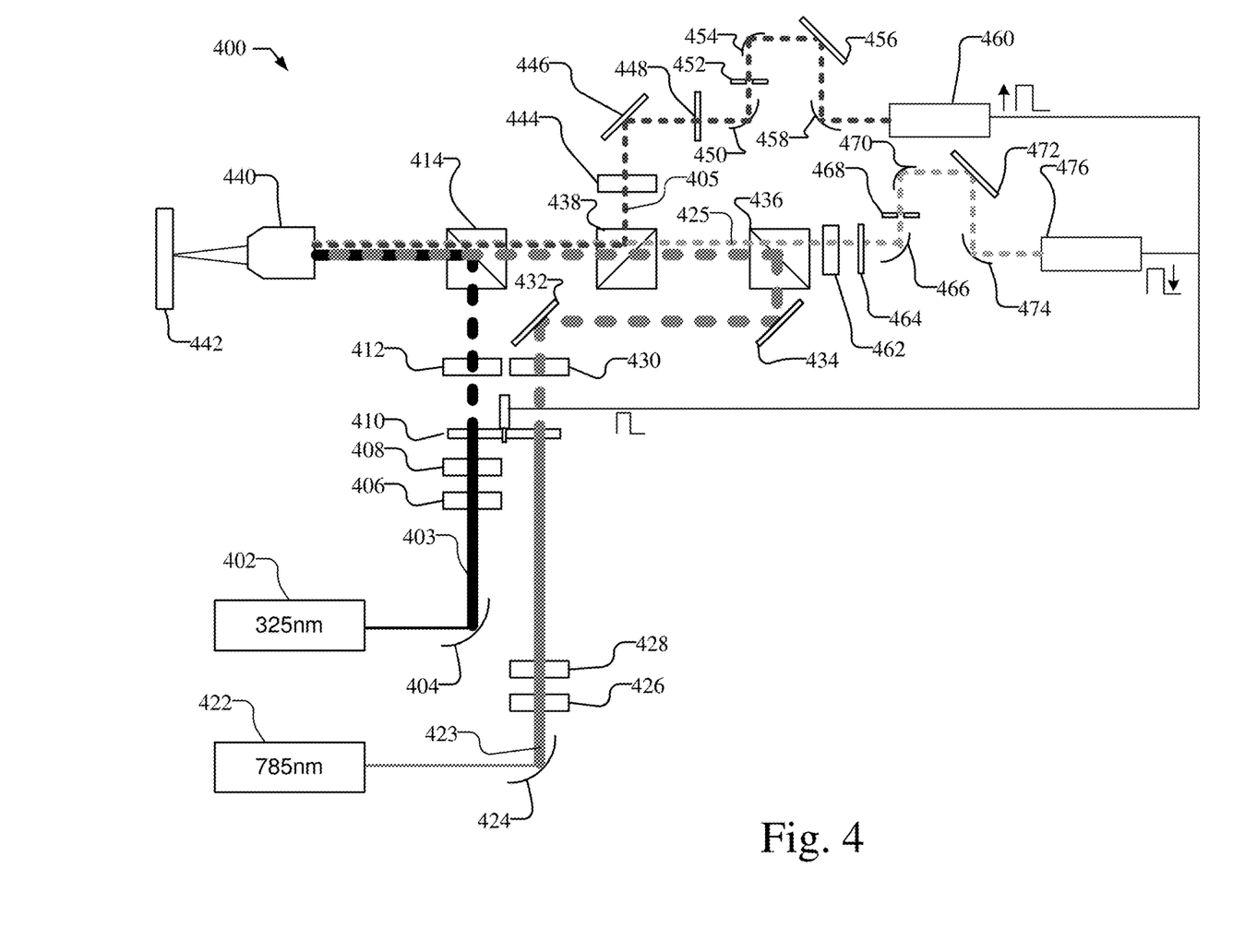
FIG. 4 illustrates a schematic representation of an optical metrology device that employs multi wavelength polarized confocal Raman spectroscopy with isolation of the Raman response signals.

FIG. 4, by way of example, illustrates a more detailed schematic representation of an optical metrology device 400 that employs multi wavelength polarized confocal Raman spectroscopy with isolation of the Raman response signals. The optical metrology device 400, which is similar to optical metrology device 200, discussed above, employs multiple excitation sources without requiring moving elements to filter the excitation frequencies from the Raman scattering response. In the example provided in FIG. 4, two excitation sources are provided for dual wavelength polarized confocal Raman spectroscopy, but it should be understood that more than two excitation sources may be used through extension of the present disclosure if desired.

As illustrated, a first light source 402 produces a first beam 403 that is expanded, illustrated by mirror 404 (e.g., off axis parabolic mirror), and passed through a first line filter 406. The first light source 402, for example, may be a laser or LED or other narrow band light source that produces light having a wavelength of 325 nm. The first line filter 406 is used to finely control the wavelength of the excitation beam from the first light source 402. The first beam 403 passes through a first polarizer 408, a chopper 410, and a first polarization rotation element 412, such as a half-wave plate before being received by the first dichroic beam splitter 414. The input polarization of the beam from light source 402 may be linear and may be controlled by means of the rotatable half wave plate 412.

A second light source 422 produces a second beam 423 that is expanded, illustrated by mirror 424 (e.g., off axis parabolic mirror), and passed through a second line filter 426, that is used to finely control the wavelength of the excitation beam from the second light source 422. The second light source 422, for example, may be a laser or LED or other narrow band light source that produces light having a wavelength of 785 nm. The second beam 423 passes through a second polarizer 428, the chopper 410, and a second polarization rotation element 430, such as a half-wave plate. The input polarization of the IR beam from light source 422 may be linear and may be controlled by means of the rotatable half wave plates 430. The chopper 410 may be a rotating chopper, or electrically controlled switches or shutters, configured so that when the first beam 403 from the first light source 402 is passed, the second beam 423 from the second light source 422 is blocked, and vice versa, when the first beam 403 from the first light source 402 is blocked, the second beam 423 from the second light source 422 is passed. FIG. 4 illustrates that the second beam 423 may be redirected with one or more mirrors 432 and 434 before being received by a second dichroic beam splitter 436.

The second dichroic beam splitter 436 is configured to direct (e.g., reflect in the example illustrated in FIG. 4) light having wavelengths of the second beam 423 towards the first dichroic beam splitter 414. The second beam 423 is received by a third dichroic beam splitter 438, which is configured to direct (e.g., transmit in the example illustrated in FIG. 4) light having wavelengths of the second beam 423 towards the first dichroic beam splitter 414.

The second beam 423 is received by the first dichroic beam splitter 414. The first dichroic beam splitter 414 is configured to direct (e.g., reflect in the example illustrated in FIG. 4) light having wavelengths of the first beam 403 towards an objective lens 440 and to direct (e.g., transmit in the example illustrated in FIG. 4) light having wavelengths of the second beam 423 towards the objective lens 440, so that the first beam 403 and the second beam 423 propagate along the same optical axis towards the objective lens 440. The objective lens 440 focuses the first beam 403 and the second beam 423 on the sample 442. The objective lens 440 may be refractive or reflective (Schwarzschild) lens. A refractive objective may allow a greater numerical aperture (up to 0.9) and operation in a pure backscattering mode, but optimizing operation in two extreme spectral regions, e.g., UV and IR, may be difficult to achieve. A reflecting objective may be more spectrally agnostic but would have a limited numerical aperture (<0.7) and the directly backscattered ray may not be available due to obscuration.

The light from first beam 403 and second beam 423 incident on the sample 442 is reflected from the sample and the excitation frequencies of the first beam 403 and the second 423 beam produce a Raman scattering response, which is received by the objective lens 440 and directed towards the first dichroic beam splitter 414. The Raman scattering response produced in response to the first beam 403 and the second beam 423 is illustrated as relatively thinner beams 405 and 425, respectively, which propagate along the same optical axis as the first beam 403 and the second beam 423. By way of example, as illustrated in Table 1, for example, if the first beam 403 has a wavelength of 325 nm, the sample may produce Raman spectra that may fall within in a range from 329 nm to 374 nm, while if the second beam 423 has a wavelength of 785 nm, the sample may produce Raman spectra that may fall within a range from 810 nm to 1144 nm. The Raman spectra produced by the UV excitation frequencies of the first beam 403 may be sometimes referred to herein as UV output 405, and the Raman spectra produced by the IR excitation frequencies of the second beam 423 may be sometimes referred to herein as IR output 425. It should be understood, however, that the optical metrology device 400 is not limited to using UV and IR excitation wavelengths, but may use other wavelengths that may be suitable for the materials of the sample under test, and that wavelengths of the output will change accordingly (as illustrated in Table 1).

The first dichroic beam splitter 414 is configured to direct the wavelength of the reflected first beam 403 back towards the first light source 402 (e.g., reflect in the example illustrated in FIG. 4), and is configured to direct the UV output 405 and IR output 425 and the wavelength of the reflected second beam 423 towards spectrometers 460 and 476 (e.g., transmit in the example illustrated in FIG. 4).

The third dichroic beam splitter 438 is configured to separate the UV output 405 from the IR output 425. For example, the third dichroic beam splitter 438 may be configured to reflect the UV output 405 towards a first spectrometer 460 and to transmit the IR output 425 (and the reflected second beam 423) towards a second spectrometer 476.

The UV output 405 that is directed by the third dichroic beam splitter 438 toward the first spectrometer 460 may pass through a first filter 444, e.g., a long pass filter, a first analyzer 448, and a pin hole 452. One or more optical elements, such as mirrors 446, 450, 454, 456, and 458, may additionally be included in the optical path to the first spectrometer 460.

The IR output 425 and the reflected second beam 423 may be received by the second dichroic beam splitter 436, which is configured to direct the wavelength of the reflected second beam 423 back towards the second light source 422 (e.g., reflect in the example illustrated in FIG. 4), and is configured to direct the IR output 425 towards second spectrometer 476 (e.g., transmit in the example illustrated in FIG. 4).

The IR output 425 that is directed by the second dichroic beam splitter 436 toward the second spectrometer 476 may pass through a second filter 462, e.g., a long pass filter, a second analyzer 464, and a pin hole 468. One or more optical elements, such as mirrors 466, 470, 472, and 474, may additionally be included in the optical path to the second spectrometer 476. The first spectrometer 460 and the second spectrometer 476 may be coupled to a controller, such as controller 280 discussed in FIG. 2.

As illustrated, the chopper 410 may produce a trigger signal, e.g., based on which beam 403 or 423 is permitted to pass. For example, for a rotating chopper 410, the trigger signal may be based on the position of the rotating chopper 410, or for an electronic switch, the trigger signal may be based on the electrical control of the electronic switch. The trigger signal is received by the first spectrometer 460 and the second spectrometer 476, which may be triggered to obtain measurements based on the trigger signals. Thus, when the UV beam is transmitted and IR beam is blocked by the chopper 410, the first spectrometer 460 may be triggered to capture the Raman spectral data and the second spectrometer 476 may be controlled to capture no data. Likewise, when the IR beam is transmitted and UV beam is blocked by the chopper 410, the second spectrometer 476 may be triggered to capture the Raman spectral data and the first spectrometer 460 may be controlled to capture no data.

Thus, with the optical metrology device 400, the spectral separation of the Raman response is achieved by injecting the UV beam (from light source 402) closer to the objective lens 440 via the first dichroic beam splitter 414 and the IR beam (from light source 422) farther upstream via the second dichroic beam splitter 436. The optical system of optical metrology device 400 is confocal. The objective lens 440 may be infinity corrected implying the need for a pin hole separated by a matched pair of focusing elements (e.g., illustrated by pin hole 452 and mirrors 450 and 454 for the UV output 405, and by pin hole 468 and mirrors 466 and 470 for the IR output 425). A single pin hole may be used if the objective lens 440 had a finite back focal plane distance. In the latter case, the pin hole size may be compromised while in the former a spectrally optimal size may be used.

The analyzers 448 and 464 may be rotatable to allow measurement of both the S and P components of the Raman spectra which may vary for patterned structures or other anisotropic optical samples. If the waveplates 412 and/or 430 were continuously rotated with the polarizer 408 and analyzer 448 and/or the polarizer 428 and analyzer 464 crossed, the Raman signal may be collected in a polarization modulated mode of operation. The Raman data in this case would be ellipsometric in character and may allow greater noise rejection.

The optical metrology device 400 may be merged with an FTIR optical system to allow simultaneous measurement of Raman and FTIR data.

Figure 5A:
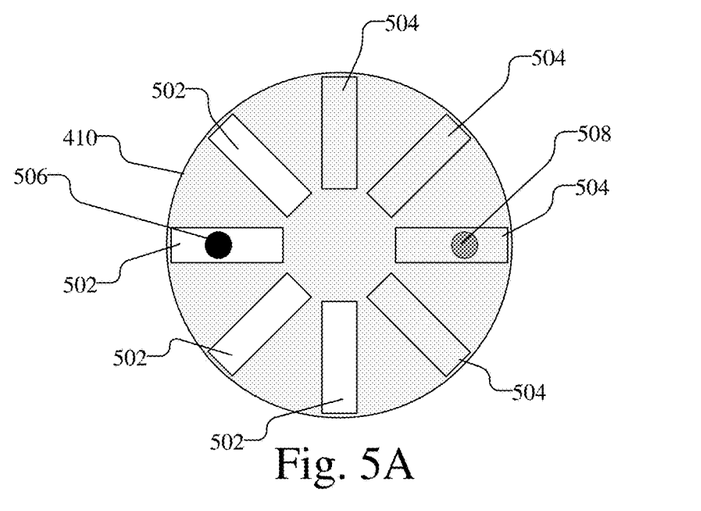
FIGS. 5A and 5B are schematic views of a rotating chopper that may be used to isolate Raman response signals.
Figure 5B:
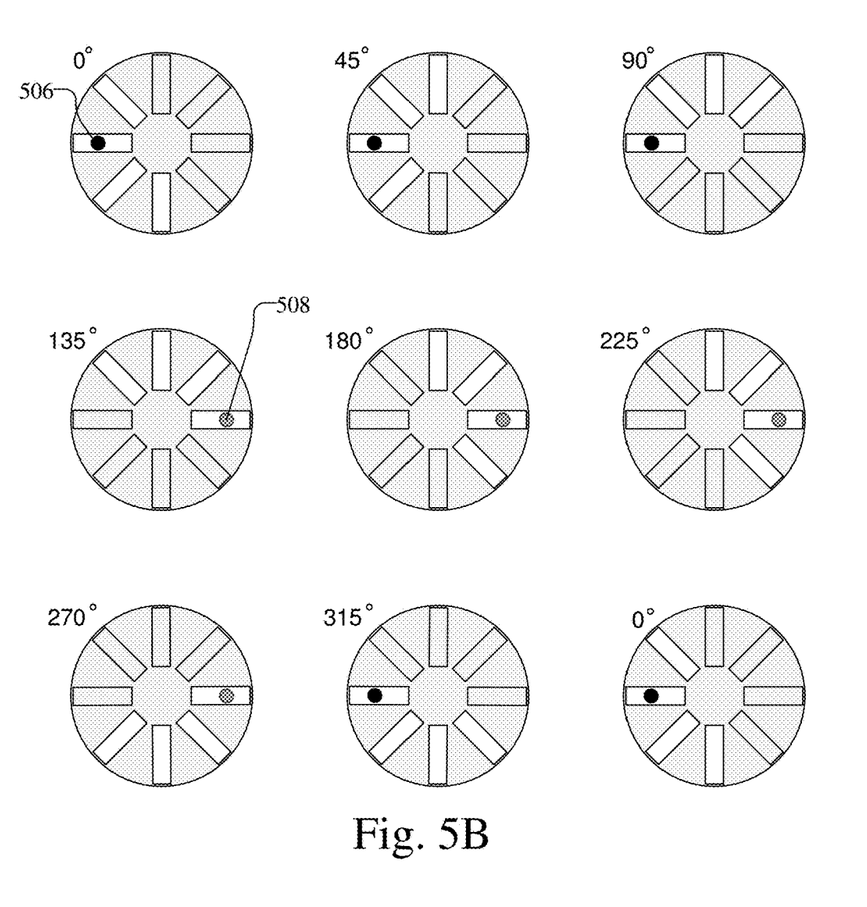

FIGS. 5A and 5B are schematic views of an embodiment of the chopper 410 in the form of a rotating chopper 410 shown in FIG. 4. As illustrated, the rotating chopper 410 may include a number of open segments 502. FIG. 5 illustrates corresponding blocked segments 504, but it should be understood that the block segments need not be individually marked on the chopper 410. FIG. 5A illustrates the UV beam 506 with black spot and the IR beam 508 with the grey spot. As can be seen, when the UV beam 506 is on an open segment 502 and thus transmitted by the rotating chopper 410, the IR beam 508 is blocked by the rotating chopper 410. FIG. 5B illustrates the rotating chopper 410 rotated to various orientations, illustrating that the UV beam 506 is transmitted at orientations of 0°, 45°, 90°, and 315°, while the IR beam is blocked, and that the IR beam 508 is transmitted at orientations of 135°, 180°, 225°, and 270°.

Figure 6:
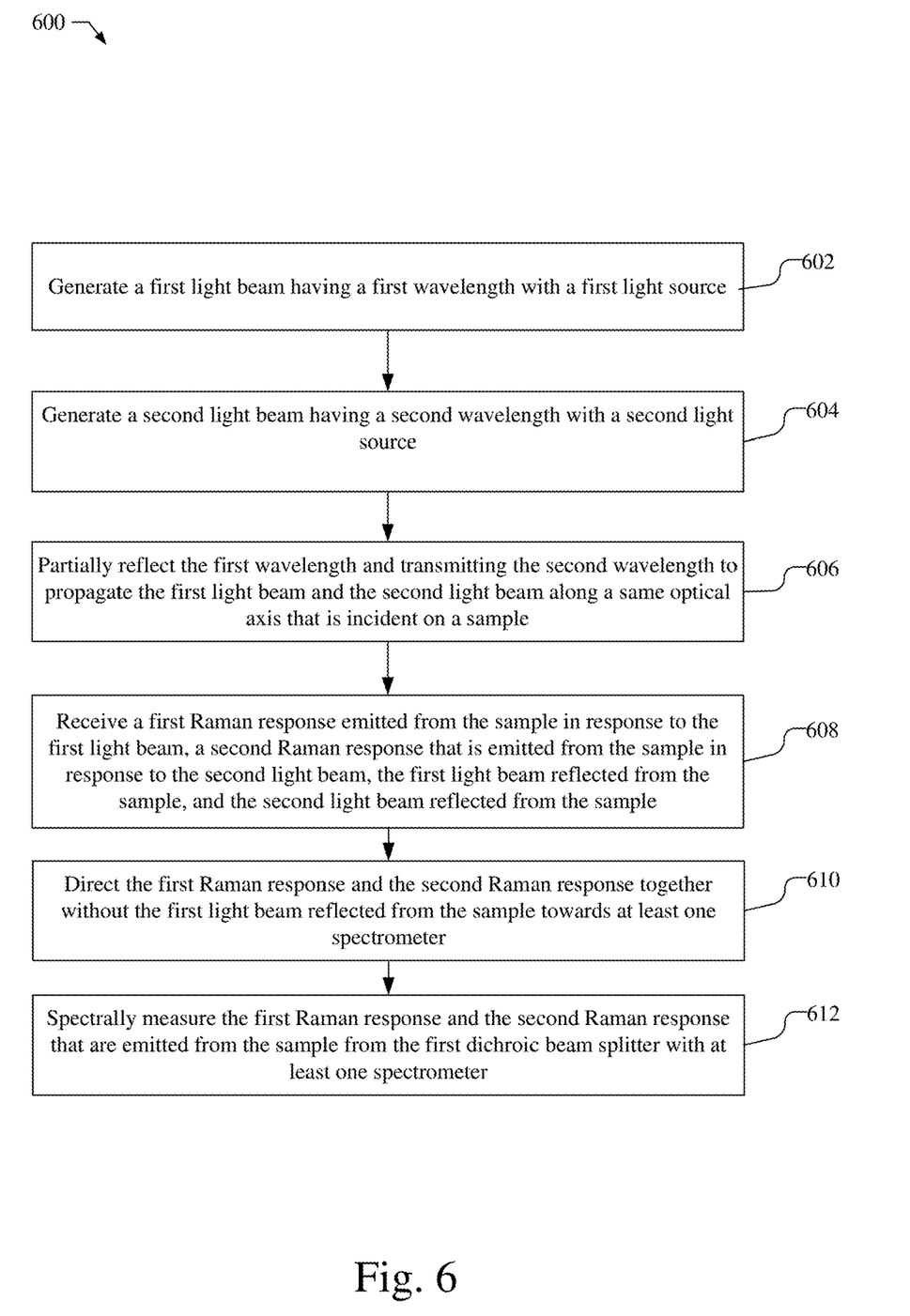
FIG. 6 is a flow chart illustrating a method of operation of an optical metrology device to perform Raman spectroscopy.

FIG. 6 is a flow chart 600 illustrating a method of operation of an optical metrology device, such as optical metrology device 200 or 400 to perform Raman spectroscopy, as discussed herein.

As illustrated by block 602, the optical metrology device generates a first light beam having a first wavelength. For example, a means for generating a first light beam with a first wavelength by the optical metrology device may be the light source 210 or 402 as illustrated in FIGS. 2 and 4, respectively. The light source that generates the first light beam having the first wavelength, for example, may be a narrow band light source, such as a laser, a light emitting diode (LED), etc. The first wavelength of the first light beam may be, e.g., ultraviolet (UV) or near UV, e.g., of 325 nm, 355 nm, 404 nm, or in some implementations, may be infrared (IR) or near IR, e.g., 785 nm or 1065 nm. If desired, other wavelengths may be used for the first light beam.

At block 604, the optical metrology device generates a second light beam having a second wavelength with a second light source. For example, a means for generating a second light beam with a second wavelength by the optical metrology device may be the light source 220 or 422 as illustrated in FIGS. 2 and 4, respectively. The light source that generates the second light beam having the first wavelength, for example, may be a narrow band light source, such as a laser, a light emitting diode (LED), etc. The second wavelength of the second light beam is different than the first wavelength, e.g., so that Raman signals by sample produced in response to the first light beam and the second light beam will be spectrally separated. For example, if the first wavelength of the first light beam is UV or near UV, the second wavelength of the second light beam may be IR or near IR, e.g., 785 nm or 1065 nm, or in some implementations, if the first wavelength of the first light beam is IR or near IR, the second wavelength of the second light beam may be UV or near UV, e.g., of 325 nm, 355 nm, 404 nm. If desired, other wavelengths may be used for the second light beam.

At block 606, the optical metrology device partially reflects the first wavelength and transmits the second wavelength to propagate the first light beam and the second light beam along a same optical axis that is incident on a sample. For example, a means for partially reflecting the first wavelength and transmitting the second wavelength to propagate the first light beam and the second light beam along a same optical axis that is incident on a sample may be the first dichroic beam splitter 216 or 414 as illustrated in FIGS. 2 and 4, respectively. In some implementations, the means for partially reflecting the first wavelength and transmitting the second wavelength with a first dichroic beam splitter to propagate the first light beam and the second light beam along a same optical axis that is incident on a sample may be a beam splitter combined with a dichroic filter, as discussed in reference to FIG. 2.

At block 608, the optical metrology device reflects a first Raman response emitted from the sample in response to the first light beam, a second Raman response that is emitted from the sample in response to the second light beam, the first light beam reflected from the sample, and the second light beam reflected from the sample. For example, a means for reflecting a first Raman response emitted from the sample in response to the first light beam, a second Raman response that is emitted from the sample in response to the second light beam may be the first dichroic beam splitter 216 or 414 as illustrated in FIGS. 2 and 4, respectively. In some implementations, the means for reflecting a first Raman response emitted from the sample in response to the first light beam, a second Raman response that is emitted from the sample in response to the second light beam may be a non-dichroic beam splitter combined with a dichroic filter, as discussed in reference to FIG. 2.

At block 610, the optical metrology device directs the first Raman response and the second Raman response together without the first light beam reflected from the sample towards at least one spectrometer. For example, a means for directing the first Raman response and the second Raman response together without the first light beam reflected from the sample to be spectrally measured may be the first dichroic beam splitter 216 or 414 as illustrated in FIGS. 2 and 4, respectively. In some implementations, the means for directing the first Raman response and the second Raman response together without the first light beam reflected from the sample to be spectrally measured may be a non-dichroic beam splitter combined with a dichroic filter, as discussed in reference to FIG. 2.

At block 612, the optical metrology device receives the first Raman response and the second Raman response that are emitted from the sample from the first dichroic beam splitter for spectrally measurement. For example, a means for spectrally measuring the first Raman response and the second Raman response that are emitted from the sample from the first dichroic beam splitter may be at least one spectrometer, such as spectrometer 250 illustrated in FIG. 2 or spectrometers 250 and 270 illustrated in FIG. 2 or spectrometers 460 and 476 illustrated in FIG. 4. In one implementation, the at least one spectrometer may be a first spectrometer and a second spectrometer, such as spectrometers 250 and 270 illustrated in FIG. 2 or spectrometers 460 and 476 illustrated in FIG. 4.

In one implementation, the second light beam reflected from the sample is directed together with the first Raman response and the second Raman response by the first dichroic beam splitter towards the at least one spectrometer. The optical metrology device may direct the second light beam from the second light source towards the first dichroic beam splitter. A means for directing the second light beam from the second light source towards the first dichroic beam splitter may be, e.g., the second dichroic beam splitter 226 or 436 as illustrated in FIGS. 2 and 4, respectively. In some implementations, the means for directing the second light beam from the second light source towards the first dichroic beam splitter may be a non-dichroic beam splitter combined with a dichroic filter, as discussed in reference to FIG. 2. The optical metrology device may further direct at least the second Raman response without the second light beam reflected from the sample towards the at least one spectrometer. A means for directing at least the second Raman response without the second light beam reflected from the sample towards the at least one spectrometer may be, e.g., the second dichroic beam splitter 226 or 436 as illustrated in FIGS. 2 and 4, respectively. In some implementations, a means for directing at least the second Raman response without the second light beam reflected from the sample towards the at least one spectrometer may be a non-dichroic beam splitter combined with a dichroic filter, as discussed in reference to FIG. 2.

In one implementation, the optical metrology device may spectrally measure the first Raman response that is emitted from the sample in response to the first light beam and may for spectrally measure the second Raman response that is emitted from the sample in response to the second light beam. For example, a means for spectrally measuring the first Raman response that is emitted from the sample in response to the first light beam may be, e.g., the spectrometer 270 or spectrometer 460 illustrated in FIGS. 2 and 4, and a means for spectrally measuring the second Raman response that is emitted from the sample in response to the second light beam may be, e.g., the spectrometer 250 or spectrometer 476 illustrated in FIGS. 2 and 4. The optical metrology device may further direct the second light beam from the second dichroic beam splitter towards the first dichroic beam splitter. A means for directing second light beam from the second dichroic beam splitter towards the first dichroic beam splitter may be, e.g., third dichroic beam splitter 236 or 438 as illustrated in FIGS. 2 and 4, respectively. In some implementations, the means for directing second light beam from the second dichroic beam splitter towards the first dichroic beam splitter may be non-dichroic beam splitter combined with a dichroic filter, as discussed in reference to FIG. 2. The optical metrology device may direct the first Raman response towards the first spectrometer. A means for directing the first Raman response towards the first spectrometer may be, e.g., third dichroic beam splitter 236 or 438 as illustrated in FIGS. 2 and 4, respectively. In some implementations, the means for directing the first Raman response towards the first spectrometer may be non-dichroic beam splitter combined with a dichroic filter, as discussed in reference to FIG. 2. The optical metrology device may direct the second beam reflected from the sample and the second Raman response together towards the second dichroic beam splitter, wherein the second dichroic beam splitter directs the second Raman response without the second light beam reflected from the sample towards the second spectrometer. For example, a means for directing the second beam reflected from the sample and the second Raman response together towards the second dichroic beam splitter, wherein the second dichroic beam splitter directs the second Raman response without the second light beam reflected from the sample may be, e.g., third dichroic beam splitter 236 or 438 as illustrated in FIGS. 2 and 4, respectively. In some implementations, the means for direct the second beam reflected from the sample and the second Raman response together towards the second dichroic beam splitter, wherein the second dichroic beam splitter directs the second Raman response without the second light beam reflected from the sample may be a non-dichroic beam splitter combined with a dichroic filter, as discussed in reference to FIG. 2.

In some implementations, the first spectrometer may include a first grating with a dispersion that is configured for wavelengths of the first Raman response that is emitted from the sample in response to the first light beam, and the second spectrometer may include a second grating with a dispersion that is configured for wavelengths of the second Raman response that is emitted from the sample in response to the second light beam, e.g., as discussed in reference to diffraction gratings 254 and 274 in FIG. 2.

In some implementations, the first wavelength of the first light beam is ultraviolet and the second wavelength of the second light beam is infrared.

In one implementation, the optical metrology device may polarize the first light beam in a first beam path and may polarize the second light beam in a second beam path. For example, a means for polarizing the first light beam in a first beam path may be, e.g., the first polarizer 214 or 408, as discussed in FIGS. 2 and 4. A means for polarizing the second light beam in a second beam path may be, e.g., the second polarizer 224 or 428 as discussed in FIGS. 2 and 4. The first polarizer and/or the second polarizer may be a linear polarizer, and additional optical components may be used to produce a desired polarization state, such as the half wave plate 412 and 430. The optical metrology device may analyze the first Raman response in a first beam path of the first Raman response, and may analyze the second Raman response in a second beam path of the second Raman response. For example, a means for analyzing the first Raman response in a first beam path of the first Raman response may be, e.g., the first analyzer 448 as discussed in FIG. 4, which may be a linear polarizer. A means for analyzing the second Raman response in a second beam path of the second Raman response may be, e.g., the second analyzer 464 as discussed in FIG. 4, which may be a linear polarizer.

In some implementations, the optical metrology device may select transmission of the first light beam while blocking or the second light beam and to select transmission of the second light beam while blocking transmission of the first light beam. For example, a means for selecting transmission of the first light beam while blocking or the second light beam and to select transmission of the second light beam while blocking transmission of the first light beam may be, e.g., the chopper 410 discussed in FIGS. 4, 5A, and 5B.

The optical metrology device, for example, may select the transmission of one of the first light beam or the second light beam by continuously switching to block transmission of the second light beam when the first light beam is transmitted, and block the transmission of the first light beam when the second light beam is transmitted. For example, a means for blocking transmission of the second light beam when the first light beam is transmitted, and blocking the transmission of the first light beam when the second light beam is transmitted may be, e.g., the chopper 410 discussed in FIGS. 4, 5A, and 5B. The at least one spectrometer may include a first spectrometer and a second spectrometer, the optical metrology device may trigger the first spectrometer to measure the first Raman response, and may trigger the second spectrometer to measure the second Raman response. For example, a means for triggering the first spectrometer to measure the first Raman response may be the chopper 410 discussed in FIGS. 4, 5A, and 5B. A means for triggering the second spectrometer to measure the second Raman response the chopper 410 discussed in FIGS. 4, 5A, and 5B.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. An optical metrology device for Raman spectroscopy, comprising:
   a first excitation source that generates a first light beam with a first wavelength;
   a second excitation source that generates a second light beam with a second wavelength;
   a first dichroic beam splitter that partially reflects the first wavelength and transmits the second wavelength so that the first light beam and the second light beam propagate along a same optical axis that is incident on a sample, the first dichroic beam splitter receives a first Raman response emitted from the sample in response to the first light beam, a second Raman response that is emitted from the sample in response to the second light beam, the first light beam reflected from the sample, and the second light beam reflected from the sample, the first dichroic beam splitter directs the first Raman response and the second Raman response together without the first light beam reflected from the sample towards at least one spectrometer;
   the at least one spectrometer that receives from the first dichroic beam splitter the first Raman response and the second Raman response that are emitted from the sample, wherein the at least one spectrometer comprises a first spectrometer that receives the first Raman response that is emitted from the sample in response to the first light beam, and a second spectrometer that receives the second Raman response that is emitted from the sample in response to the second light beam; and
   a second dichroic beam splitter that separates the first Raman response and the second Raman response, directs the first Raman response towards the first spectrometer, and directs the second Raman response towards the second spectrometer.

2. The optical metrology device of claim 1, wherein the first dichroic beam splitter directs the second light beam reflected from the sample together with the first Raman response and the second Raman response towards the at least one spectrometer, further comprising:
   a third dichroic beam splitter that directs the second light beam from the second excitation source towards the first dichroic beam splitter and directs at least the second Raman response without the second light beam reflected from the sample towards the at least one spectrometer.

3. The optical metrology device of claim 2, wherein:
   the second dichroic beam splitter directs the second light beam from the third dichroic beam splitter towards the first dichroic beam splitter, and directs the second light beam reflected from the sample and the second Raman response together towards the third dichroic beam splitter, wherein the third dichroic beam splitter directs the second Raman response without the second light beam reflected from the sample towards the second spectrometer.

4. The optical metrology device of claim 3, wherein the first spectrometer comprises a first grating with a dispersion that is configured for wavelengths of the first Raman response that is emitted from the sample in response to the first light beam, and the second spectrometer comprises a second grating with a dispersion that is configured for wavelengths of the second Raman response that is emitted from the sample in response to the second light beam.

5. The optical metrology device of claim 3, wherein the first wavelength of the first light beam is ultraviolet and the second wavelength of the second light beam is infrared.

6. The optical metrology device of claim 1, further comprising:
   a first polarizer in a first beam path of the first light beam;
   a second polarizer in a second beam path of the second light beam;
   a first analyzer in a third beam path of the first Raman response; and
   a second analyzer in a fourth beam path of the second Raman response.

7. The optical metrology device of claim 1, further comprising a chopper that selects transmission of the first light beam while blocking the second light beam and to selects transmission of the second light beam while blocking transmission of the first light beam.

8. The optical metrology device of claim 7, wherein the chopper continuously switches to select the transmission of only one of the first light beam or the second light beam, wherein the chopper blocks transmission of the second light beam when the first light beam is transmitted, and blocks the transmission of the first light beam when the second light beam is transmitted, and wherein:
the first spectrometer is triggered by the chopper to measure the first Raman response; and
the second spectrometer is triggered by the chopper to measure the second Raman response.

9. A method of Raman spectroscopy, comprising:
generating a first light beam having a first wavelength with a first excitation source;
generating a second light beam having a second wavelength with a second excitation source;
partially reflecting the first wavelength and transmitting the second wavelength with a first dichroic beam splitter to propagate the first light beam and the second light beam along a same optical axis that is incident on a sample,
receiving with the first dichroic beam splitter a first Raman response emitted from the sample in response to the first light beam, a second Raman response that is emitted from the sample in response to the second light beam, the first light beam reflected from the sample, and the second light beam reflected from the sample;
directing with the first dichroic beam splitter the first Raman response and the second Raman response together without the first light beam reflected from the sample towards at least one spectrometer;
receiving the first Raman response and the second Raman response that are emitted from the sample from the first dichroic beam splitter with the at least one spectrometer, wherein the at least one spectrometer comprises a first spectrometer and a second spectrometer, the method further comprising:
separating with a second dichroic beam splitter the first Raman response and the second Raman response;
directing with the second dichroic beam splitter the first Raman response towards the first spectrometer;
directing with the second dichroic beam splitter the second Raman response towards the second spectrometer;
spectrally measuring the first Raman response that is emitted from the sample in response to the first light beam with the first spectrometer; and
spectrally measuring the second Raman response that is emitted from the sample in response to the second light beam with the second spectrometer.

10. The method of claim 9, wherein the second light beam reflected from the sample is directed together with the first Raman response and the second Raman response by the first dichroic beam splitter towards the at least one spectrometer, the method further comprising:
directing with a third dichroic beam splitter the second light beam from the second excitation source towards the first dichroic beam splitter; and
directing with the third dichroic beam splitter at least the second Raman response without the second light beam reflected from the sample towards the at least one spectrometer.

11. The method of claim 10, the method further comprising:
directing with the second dichroic beam splitter the second light beam from the third dichroic beam splitter towards the first dichroic beam splitter; and
directing with the second dichroic beam splitter the second light beam reflected from the sample and the second Raman response together towards the third dichroic beam splitter, wherein the third dichroic beam splitter directs the second Raman response without the second light beam reflected from the sample towards the second spectrometer.

12. The method of claim 11, wherein the first spectrometer comprises a first grating with a dispersion that is configured for wavelengths of the first Raman response that is emitted from the sample in response to the first light beam, and the second spectrometer comprises a second grating with a dispersion that is configured for wavelengths of the second Raman response that is emitted from the sample in response to the second light beam.

13. The method of claim 11, wherein the first wavelength of the first light beam is ultraviolet and the second wavelength of the second light beam is infrared.

14. The method of claim 9, further comprising:
polarizing the first light beam with a first polarizer in a first beam path;
polarizing the second light beam with a second polarizer in a second beam path;
analyzing the first Raman response with a first analyzer in a third beam path of the first Raman response; and
analyzing the second Raman response with a second analyzer in a fourth beam path of the second Raman response.

15. The method of claim 9, further comprising selecting transmission of the first light beam while blocking the second light beam and to select transmission of the second light beam while blocking transmission of the first light beam with a chopper.

16. The method of claim 15, wherein selecting the transmission of one of the first light beam or the second light beam with the chopper comprises continuously switching to block transmission of the second light beam when the first light beam is transmitted, and block the transmission of the first light beam when the second light beam is transmitted, the method comprising:
triggering the first spectrometer by the chopper to measure the first Raman response; and
triggering the second spectrometer by the chopper to measure the second Raman response.

17. An optical metrology device for Raman spectroscopy, comprising:
means for generating a first excitation light beam having a first wavelength;
means for generating a second excitation light beam having a second wavelength;
means for partially reflecting the first wavelength and transmitting the second wavelength with to propagate the first excitation light beam and the second excitation light beam along a same optical axis that is incident on a sample, and receiving a first Raman response emitted from the sample in response to the first excitation light beam, a second Raman response that is emitted from the sample in response to the second excitation light beam, the first excitation light beam reflected from the sample, and the second excitation light beam reflected from the sample, and directing the first Raman response and the second Raman response together without the first excitation light beam reflected from the sample to be spectrally measured;

means for spectrally measuring the first Raman response and the second Raman response that are emitted from the sample, wherein the means for spectrally measuring comprises a first spectrometer that receives the first Raman response that is emitted from the sample in response to the first excitation light beam, and a second spectrometer that receives the second Raman response that is emitted from the sample in response to the second excitation light beam; and a means for separating the first Raman response and the second Raman response, directing the first Raman response towards the first spectrometer, and directing the second Raman response towards the second spectrometer.

18. The optical metrology device of claim 17, wherein the second excitation light beam reflected from the sample is directed together with the first Raman response and the second Raman response by the means for partially reflecting the first wavelength and transmitting the second wavelength towards the means for spectrally measuring, the optical metrology device further comprising:

means for directing the second excitation light beam from the means for generating a second excitation light beam towards the sample, and directing at least the second Raman response without the second excitation light beam reflected from the sample to be spectrally measured.

19. The optical metrology device of claim 17, further comprising means for selecting transmission of the first excitation light beam while blocking the second excitation light beam and selecting transmission of the second excitation light beam while blocking transmission of the first excitation light beam.

20. The optical metrology device of claim 19, the optical metrology device further comprises:

means for triggering the first spectrometer to measure the first Raman response while the means for selecting transmission selects transmission of the first excitation light beam; and means for triggering the second spectrometer to measure the second Raman response while the means for selecting transmission selects transmission of the second excitation light beam.

\* \* \* \* \*